United States Patent [19]

Hull

[11] Patent Number: 5,909,680
[45] Date of Patent: Jun. 1, 1999

[54] DOCUMENT CATEGORIZATION BY WORD LENGTH DISTRIBUTION ANALYSIS

[75] Inventor: Jonathan J. Hull, Cupertino, Calif.

[73] Assignees: Ricoh Company Limited, Japan; Ricoh Corporation, Menlo Park, Calif.

[21] Appl. No.: 08/709,707

[22] Filed: Sep. 9, 1996

[51] Int. Cl.[6] .................................................. G06F 9/00
[52] U.S. Cl. .............................................. 707/6; 707/104
[58] Field of Search .................................... 707/6, 104, 7

[56] References Cited

U.S. PATENT DOCUMENTS

| | | | |
|---|---|---|---|
| 4,839,853 | 6/1989 | Deerwester et al. | 707/5 |
| 5,159,667 | 10/1992 | Borret et al. | 707/500 |
| 5,369,577 | 11/1994 | Kadashevich et al. | 704/9 |
| 5,418,951 | 5/1995 | Damashek | 707/1 |
| 5,465,353 | 11/1995 | Hull et al. | 707/5 |
| 5,537,586 | 7/1996 | Amram et al. | 707/3 |
| 5,542,089 | 7/1996 | Lindsay et al. | 707/2 |
| 5,642,522 | 6/1997 | Zaenen et al. | 707/532 |
| 5,689,585 | 11/1997 | Bloomberg et al. | 382/229 |

OTHER PUBLICATIONS

Inspec Abstract No. C79024302 Cluster Analysis of English Text, Toussaint & Shinghal, May 31, 1978.

M. Damashek, "Gauging similarity with n–grams: Language–independent categorization of text," Science 267,10 (Feb. 10, 1995), pp. 843–848.

R. Shinghal and G.T. Toussaint, "Cluster analysis of English text," Proceedings of the IEEE Computer Society Conference on Pattern Recognition and Image Processing, Chicago, Illinois, May 31–Jun. 2, 1978, pp. 164–172.

Chen and Haralick, "Extraction of Text Layout Structures on Document Images Based on Statistical Characterization," *Proceedings of the SPIE Document Recognition II Conference* (Feb. 1995).

J.J. Hull and Y. Li, "Word Recognition Result Interpretation Using the Vector Space Model for Information Retrieval," Proceedings of the IEEE Computer Society Conference on Second Annual Symposium on Document Analysis and Information Retrieval, Las Vegas, Nevada, Apr. 26–28, 1993, pp. 147–155.

J.M. Tenkle and R.C. Vogt, "Word Recognition for Information Retrieval in the Image Domain," Proceedings of the IEEE Computer Society Conference on Second Annual Symposium on Document Analysis and Information Retrieval, Las Vegas, Nevada, Apr. 26–28, 1993, pp. 105–122.

*Primary Examiner*—Thomas G. Black
*Assistant Examiner*—John G. Mills, III
*Attorney, Agent, or Firm*—Townsend and Townsend and Crew LLP

[57] ABSTRACT

A system and method for efficient document categorization are disclosed. In one embodiment, word length distribution information is used as a basis for categorization. Greater than 90% accuracy in classification may be achieved in, e.g., distinguishing newspaper articles from scientific journal articles. Word length distribution information may be developed without optical character recognition (OCR), permitting use of degraded document images.

23 Claims, 3 Drawing Sheets

$[(P_{following\ word\ length=1} | P_{word\ length=1}), (P_{following\ word\ length=2} | P_{word\ length=1}),$
$(P_{following\ word\ length=3} | P_{word\ length=1}), \ldots (P_{following\ word\ length=N} | P_{word\ length=1}),$
$(P_{following\ word\ length=1} | P_{word\ length=2}), \ldots (P_{following\ word\ length=N} | P_{word\ length=N})]$

[P(following word length=1, word length=1), P(following word length=2, word length=1), ... P(following word length=N, word length=1),
P(following word length=3, word length=1), ... P(following word length=N, word length=1),
P(following word length=1, word length=2), ... ... P(following word length=N, word length=N)]

FIG. 3

[(P$_{following\ word\ length=1}$ | P$_{word\ length=1}$), (P$_{following\ word\ length=2}$ | P$_{word\ length=1}$), ... (P$_{following\ word\ length=N}$ | P$_{word\ length=1}$),
(P$_{following\ word\ length=3}$ | P$_{word\ length=1}$), ... (P$_{following\ word\ length=N}$ | P$_{word\ length=1}$),
(P$_{following\ word\ length=1}$ | P$_{word\ length=2}$), ... ... (P$_{following\ word\ length=N}$ | P$_{word\ length=N}$)]

FIG. 4

DOCUMENT CATEGORIZATION BY WORD LENGTH DISTRIBUTION ANALYSIS

BACKGROUND OF THE INVENTION

Embodiments of the present invention relate to a system and method for categorizing documents and more particularly to document categorization that takes advantage of word length distribution analysis.

Automatic classification or categorization is an important function of a complete electronic document management system. It permits automatic filing of documents where the user would like scanned document images to be automatically routed to directories that contain similar material. For example, the user may wish to automatically store newspaper articles with other newspaper articles and scientific journal articles with other scientific journal articles.

One known technique analyzes general visual features of document images and matches them to distributions from other documents to derive decisions. This technique however does not take text semantics into account. Systems embodying this technique are available from Documagix of San Jose, Calif. and Visioneer of Palo Alto, Calif.

Textual features are another possible basis for categorization. The document management system would search a newly scanned document for keywords associated with categories. This categorization procedure however requires optical character recognition (OCR) which does not operate well on degraded images. Also, this procedure requires that each document be easily classified by the keywords found within it.

Yet another possible technique utilizes character transition probabilities, i.e., given a particular character, what is the probability of another character following. This technique also relies on OCR to identify characters. One prior art system accepts a document and returns other documents relating to similar topics by comparing character transition probability distributions. This system retrieves only semantically similar documents with documents on similar topics being classed together. This is a narrower categorization than necessary in many applications which only require distinguishing among generic classes such as newspaper stories or scientific articles. Although highly accurate when working with high quality images, this technique is computationally intensive and slow.

What is needed is a document categorization system that is capable of classifying documents into broad categories but that is able to use degraded images as input.

SUMMARY OF THE INVENTION

A system and method for efficient document categorization are provided by virtue of the present invention. In one embodiment, word length distribution information is used as a basis for categorization. The categorization technique minimizes computation and use of storage resources. Greater than 90% accuracy in classification may be achieved in, e.g., distinguishing newspaper articles from scientific journal articles. Word length distribution information may be developed without optical character recognition (OCR), permitting use of degraded document images.

In one embodiment, an electronic representation of an image of a document is provided. Word length distribution information for this document is developed for the image. The document is categorized responsive to the so-obtained word length distribution information.

Developing word length distribution information may include establishing a feature vector including word length distribution transition probabilities. In one form of this feature vector, it includes elements giving the probability, given a word of length x of a following word of length y, for all x,y pairs where x and y are less than or equal to N. In another form of this feature vector, it includes elements giving the probability of a word of lengthy y following a word of length x for all x,y pairs where x and y are less than or equal to N.

A representative feature vector may be provided for each category. Categorization then includes finding the representative feature vector closest to the feature vector established for the document.

A further understanding of the nature and advantages of the inventions herein may be realized by reference to the remaining portions of the specification and the attached drawings.

BRIEF DESCRIPTION OF THE DRAWINGS

FIG. 3 depicts a first representative feature vector usable for characterizing word length distribution information in accordance with one embodiment of the present invention.

FIG. 4 depicts a second representative feature vector usable for characterizing word length distribution information in accordance with on embodiment of the present invention.

DESCRIPTION OF SPECIFIC EMBODIMENTS

Figure 1:
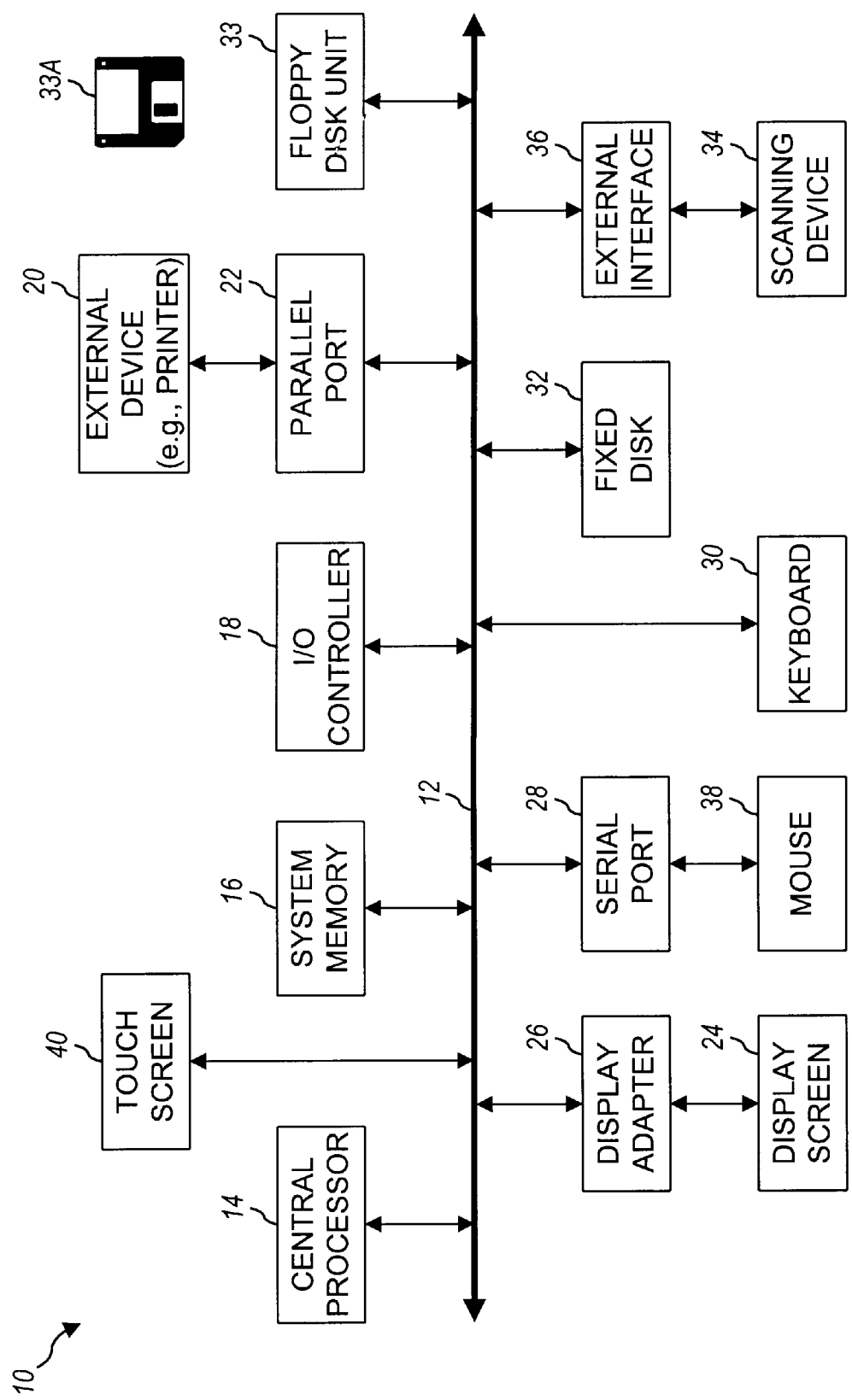
FIG. 1 depicts a representative computer system suitable for implementing the present invention.

FIG. 1 shows basic subsystems of a computer system suitable for use with the present invention. In FIG. 1, computer system 10 includes bus 12 which interconnects major subsystems such as central processor 14, system memory 16, input/output (I/O) controller 18, an external device such as a printer 20 via parallel port 22, display screen 24 via display adapter 26, serial port 28, keyboard 30, fixed disk drive 32 and floppy disk drive 33 operative to receive a floppy disk 33A. Many other devices can be connected such as scanning device 34 connected via external interface 36, mouse 38 connected via serial port 28 and touch screen 40 connected directly. Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage media such as fixed disk 32 or floppy disk 33A.

Figure 2:
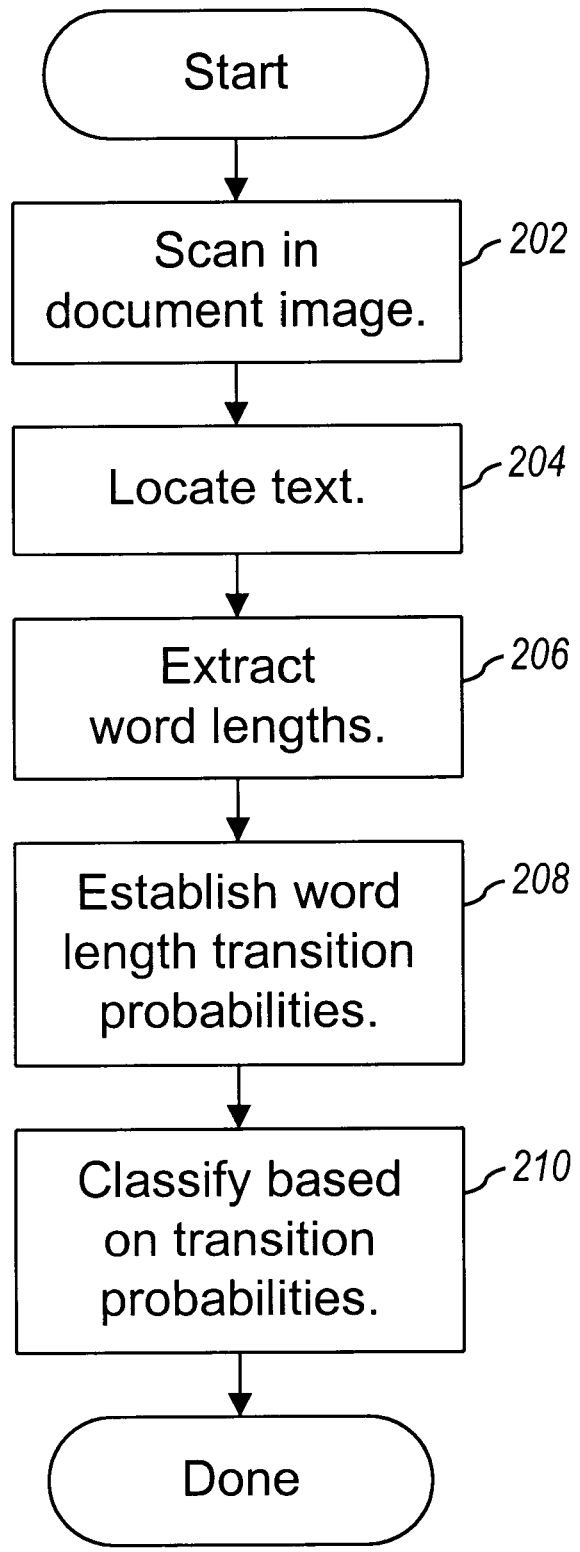
FIG. 2 depicts a top-level flowchart describing steps of categorizing a document in accordance with one embodiment of the present invention.

FIG. 2 depicts a top-level flowchart describing steps of categorizing a document in accordance with one embodiment of the present invention. At step 202, scanning device 34 scans in an image of the document to be categorized. At step 204, the text is located on the document by use of standard page segmentation techniques. Alternatively, the categorization may also occur off-line based on previously stored data. At step 206, the length, e.g., the number of characters, of each word in the text is determined.

One way of determining the length of a word is optical character recognition (OCR) followed by a character count of each word. However, the present invention also contemplates determining the length of words without resort to OCR by measuring the physical length of words in pixels. This may be done, for example, by use of word segmentation techniques as explained in Chen & Haralick, "Extraction of Text Layout Structures on Document Images Based on Statistical Characterization," *Proceedings of the SPIE Document Recognition II Conference* (Feb. 1995), the contents of which are herein incorporated by reference. Normalization and/or scaling may be applied to the pixel length to obtain a length estimate in terms of characters. This provides accelerated classification and is also robust to image degradations.

At step 208, probability distributions are established for the word lengths. Preferably, a feature vector is established with each element corresponding to the probability of a word length or sequence of word lengths. Details of this feature vector are described with reference to FIGS. 3–4. Word length may be defined in terms of characters or in terms of pixels. Alternatively, pixel length estimates may be converted to character length estimates by normalization and scaling.

At step 210, the document is classified based on the word length distribution information established at step 208. Preferably, the feature vector established at step 208 is compared to predetermined representative feature vectors established for each possible category. The document is assigned to the category represented by the closest feature vector. Distance between feature vectors may be evaluated based on a Euclidean metric.

Optimal feature vector design is a tradeoff between classification accuracy on the one hand and vector storage and training data requirements on the other hand. One possible feature vector 302 is depicted by FIG. 3 and includes first order joint probabilities. Each element may be specified by an ordered pair (x,y) and represents the joint probability of a word of x characters and an immediately following word of y characters. Feature vector 302 includes elements for each ordered pair (x,y) where x and y are<N.

Another possible feature vector 402 is depicted in FIG. 4 and includes first order transitional probabilities. Each element may be specified by an ordered pair (x,y) and represents the probability that given a word of length x, a word of length y follows immediately. Feature vector 402 also includes elements for each ordered pair (x,y) where x and y are<N.

Additional possible feature vector elements could represent 0th order probabilities, e.g., the probability of a word having a given number of characters. The present invention also contemplates use of second or higher order transition or joint probabilities to characterize word length correlation between words spaced more than one word apart. For example, second order elements would correspond to the probabilities of ordered triplets of word length sequences.

Thus choices in selecting a feature vector include 1) whether to use joint probabilities or transition probabilities, 2) how large N should be, and 3) what order elements to include. It has been discovered empirically that joint probabilities provide more effective classification. Setting N=15 provides probability information on most all the words in typical documents.

Extending a first order feature vector with 0th order and/or 2nd or higher order elements may increase accuracy at the expense of lengthening the feature vector. One disadvantage of a longer feature vector is a greater storage requirement for both the feature vector representing the document and the feature vectors representing categories. Furthermore, to achieve the potential for greater classification accuracy inherent in a longer feature vector, a larger set of training data must be used to establish feature vectors that accurately represent categories. Accordingly, the preferred embodiment incorporates only 1st order joint probabilities as shown in FIG. 3 with N=15. It is also possible to use only 0th order elements at some expense in accuracy.

To establish representative feature vectors for categories, a training procedure is followed. For each category, a user scans in a series of sample documents known to belong to that category or inputs pre-existing electronic representations of these documents. The appropriate feature vector is established for each document in the series. A representative feature vector for the category may then be established to be a mean of the feature vectors of the sample documents. Alternatively, each sample document feature vector could be established to be a representative feature vector for classification, giving each category multiple representative feature vectors.

Using first order probability information, 93% accuracy was achieved in distinguishing newspaper articles from scientific papers. Approximately 90% accuracy was achieved using only 0th order probabilities.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents.

What is claimed is:

1. A computer-implemented method for categorizing digitized documents comprising the steps of:

providing an electronic representation of an image of a document;

developing word length distribution information of said image from said electronic representation wherein said word length distribution information includes a document feature vector characterizing said document, said document feature vector comprises elements representative of distribution of estimates of word lengths, said elements comprise conditional probabilities of words of A characters proximate to words of B characters, for a plurality of values of A and B; and categorizing said document responsive to said word length distribution information and word length distribution information for representative categories of documents.

2. The method of claim 1 wherein said conditional probabilities include, for a plurality of values of A and B, joint probabilities of a word of A characters and a following word of B characters.

3. The method of claim 1 wherein said conditional probabilities include, for a plurality of values of A and B, transitional probabilities that given a word of A characters, a word of B characters follows after said word of A characters.

4. The method of claim 1 wherein said conditional probabilities include 0th order probabilities for word length estimates.

5. The method of claim 1 wherein said conditional probabilities include 1st order probabilities for word length estimates.

6. The method of claim 1 wherein said conditional probabilities include 2nd order probabilities for word length estimates.

7. The method of claim 1 wherein said categorizing step comprises:
comparing said document feature rector to a set of feature vectors for said representative categories of documents; and
assigning a category to said document based on a feature vector of said set most similar to said document feature vector.

8. The method of claim 1 wherein said developing step comprises:
invoking optical character recognition to obtain word length estimates.

9. The method of claim 1 wherein said developing step comprises:
estimating pixel lengths of words of said document image to obtain word length estimates.

10. A computer program product for categorizing documents comprising:
code for providing an electronic representation of an image of a document;
code for developing word length distribution information of said image from said electronic representation wherein said word length distribution information includes a document feature vector characterizing said document, said document feature vector comprise elements representative of distribution of estimate of word lengths, said elements comprise conditional probabilities of words of A characters proximate to words of B characters, for a plurality of values of A and B;
code for categorizing said document responsive to said word length distribution information; and
a computer-readable storage medium for storing said codes.

11. The product of claim 10 wherein said conditional probabilities include, for plurality of values of A and B, joint probabilities of a word of A characters and a following word of B characters.

12. The product of claim 10 wherein said conditional probabilities include, for plurality of values of A and B, transitional probabilites that after given a word of A characters, a word of B characters follows after said word of A characters.

13. The product of claim 10 wherein said conditional probabilities include 0th order probabilities for word length estimates.

14. The product of claim 10 wherein said conditional probabilities include 1st order probabilities for word length estimates.

15. The product of claim 10 wherein said conditional probabilities include 2nd order probabilities for word length estimates.

16. The product of claim 10 wherein said categorizing code comprises:
code for comparing said document feature vector to a set of feature vectors for swaid representative categories of documents; and
code for assigning a category to said document based on a feature vector of said set most similar to said document feature vector.

17. The product of claim 10 wherein said developing code comprises:
code for invoking optical character recognition to obtain word length estimates.

18. The product of claim 10 wherein said developing code comprises:
code for estimating pixel lengths of words of said document image to obtain word length estimates.

19. A computer-implemented method for categorizing digitized documents comprising the steps of:
providing an electronic representation of an image of a document;
developing word length information of said image from said electronic representation, wherein said word length information includes a document feature vector characterizing said document, said document feature vector comprises elements representative of word length estimates, said elements comprise statistics of word lengths of a plurality of words located within a predetermined proximity; and
categorizing said document responsive to said word length information and word length information for representative categories of documents.

20. The method of claim 19 wherein said conditional probabilities include joint probabilities of a word of length A and a following word of length B, for a plurality of values of A and B.

21. The method of claim 19 wherein said conditional probabilities include transitional probabilities that given a word of length A a word of length B follows after said word of length A, for a plurality of values of A and B.

22. The method of claim 19 wherein said conditional probabilities include 1st order probabilities for word length estimates.

23. The method of claim 19 wherein said conditional probabilities 2nd order probabilities for word length estimates.

* * * * *